United States Patent [19]

Munters et al.

[11] 4,002,040
[45] Jan. 11, 1977

[54] METHOD OF COOLING AIR AND APPARATUS INTENDED THEREFOR

[75] Inventors: Carl Munters, Minusio; Per Norback, Lidingo, Sweden

[73] Assignee: AB Carl Munters, Sollentuna, Sweden

[22] Filed: July 17, 1974

[21] Appl. No.: 489,236

[30] Foreign Application Priority Data

July 8, 1973 Sweden ............... 7310061

[52] U.S. Cl. .................. 62/121; 62/314
[51] Int. Cl.² ............ F28C 1/00; F28D 5/00
[58] Field of Search .......... 62/121, 314, 309, 310, 62/171; 165/60

[56] References Cited

UNITED STATES PATENTS

| | | | |
|---|---|---|---|
| 1,721,589 | 7/1929 | Donaldson | 62/310 |
| 1,808,982 | 6/1931 | Harris | 62/121 |
| 1,966,275 | 7/1934 | Wright | 62/121 |
| 1,986,529 | 1/1935 | Ray | 62/314 |
| 2,058,042 | 10/1936 | Shipman | 62/95 |
| 2,069,359 | 2/1937 | Dudley | 62/309 |
| 2,107,280 | 2/1938 | Ballard | 62/171 |
| 2,127,582 | 8/1938 | Baruch | 62/310 |
| 2,150,514 | 3/1939 | McInnerney | 62/314 |
| 2,174,060 | 9/1939 | Miehart | 62/310 |
| 2,211,033 | 8/1940 | Shipman | 62/121 |
| 2,211,886 | 8/1940 | Dudley | 62/121 |
| 2,225,795 | 12/1940 | Pernot | 165/60 |
| 2,805,559 | 9/1957 | Hamilton | 62/310 |
| 2,825,210 | 3/1958 | Carr | 62/310 |
| 2,867,990 | 1/1959 | Cary | 62/171 |
| 3,214,936 | 11/1965 | Di Peri | 62/310 |
| 3,718,008 | 2/1973 | Zusmanovich | 62/314 |
| 3,877,244 | 4/1975 | Di Peri | 62/314 |

*Primary Examiner*—Lloyd L. King
*Attorney, Agent, or Firm*—Eric Y. Munson

[57] ABSTRACT

A method and apparatus provides conditioning of an air stream by cooling in a regenerative heat exchanger having two groups of channels separated from one another by walls through which heat exchange occurs. The air stream to be conditioned flows through one group of channels while an auxiliary air stream flows through a second group of channels the walls of which comprise wettable material maintained wet by means of water which is caused to evaporate by the auxiliary air stream to result in cooling. The wettable material provides a substantially stationary liquid layer maintained in the channels of auxiliary air flow so that evaporation takes place directly from the walls separating the two groups of channels to obtain high heat exchange efficiency. The wettable material may be wick-like absorbing material layers which eliminate the requirement of continuously flowing large quantities of water so that the evaporative surfaces may be rewetted intermittently and kept wet over a period of time prior to subsequent rewetting. This is accomplished by providing an excess amount of water. In addition, intensive rinsing of the evaporative surfaces may take place to remove dust particles and mineral deposits occurring in the water. The auxiliary air stream may be split off from the stream of air to be conditioned before and/or after the air stream has been conditioned by cooling to provide greater efficiency.

8 Claims, 9 Drawing Figures

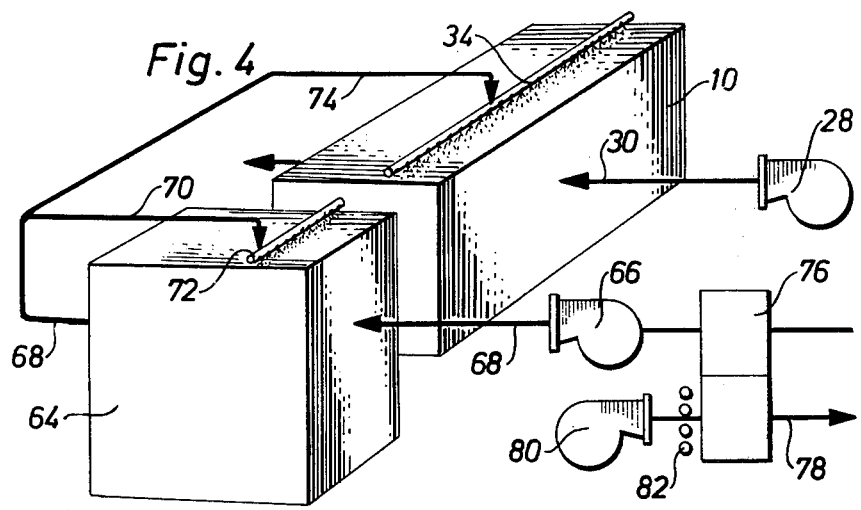
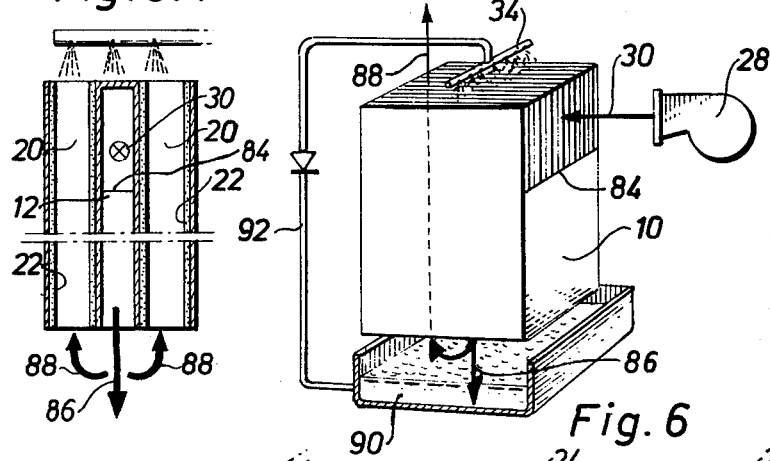
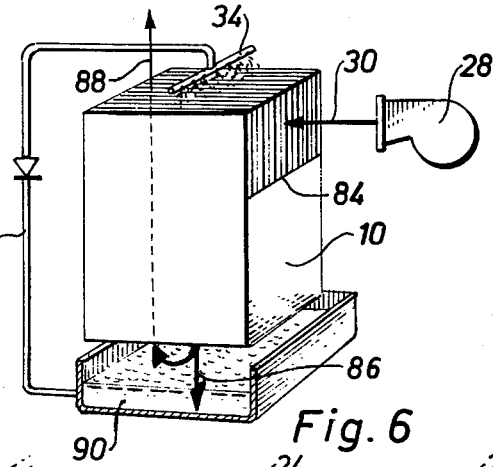
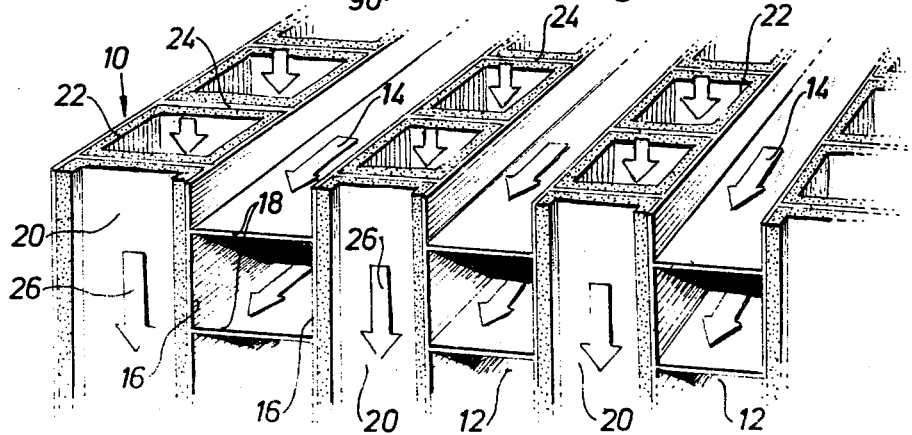

METHOD OF COOLING AIR AND APPARATUS INTENDED THEREFOR

BACKGROUND OF THE INVENTION

This invention relates to an apparatus and a method of cooling a first air stream, hereinafter also referred to as the stream of air to be conditioned, by means of another air stream, hereinafter also referred to as the auxiliary air stream, in a regenerative heat exchanger having two groups of channels or passageways separated from one another through the walls of which heat exchange between the two air streams is effected.

One main object of the invention is to provide a high cooling effect in the heat exchanger so that conditioning of the air for a space to desired temperature level can be effected solely or at least to a substantial part by means of the regenerative heat exchanger. This is especially important for operation in such climate where warm atmospheric air has low relative moisture content. According to the invention, the walls of the channels or passageways for the auxiliary air stream are kept wetted by intermittent application of an excess amount of water for a short period of time with water which is caused to evaporate by means of this air stream, while the stream of air to be conditioned passes through the intermediate channels or passageways with substantially unchanged moisture content.

The cooling effect is increased further by using as auxiliary air stream wholly or partly an air stream which earlier has passed channels or passageways provided with wetted walls of the heat exchanger or an auxiliary heat exchanger. The invention also comprises an apparatus particularly suited for carrying out the method.

The invention shall hereinafter be described in more detail with reference to some embodiments of apparatus for carrying out the method shown by way of example in the accompanying drawings, further features characterizing the invention being indicated in this connection also.

BRIEF DESCRIPTION OF THE DRAWINGS

FIGS. 1 –5 show diagrammatically five various embodiments of air cooling apparatus constructed for carrying out the method of the invention.

FIG. 5 is a sectional view on an enlarged scale of a portion of the heat exchanger according to FIG. 5.

FIG. 6 is a perspective sectional view on an enlarged scale of a portion of a heat exchanger.

DESCRIPTION OF THE PREFERRED EMBODIMENTS

Figure 1:
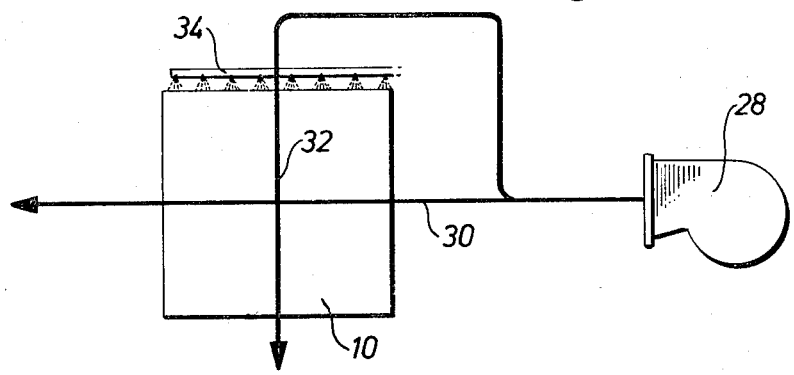

Referring now to the drawings, reference numeral 10 denotes a heat exchanger of regenerative type i.e. which has two groups of channels or passageways separated from one another in such a manner that air streams passing through the same do not come into direct contact with one another. In the embodiments illustrated in FIGS. 1–4 the heat exchanger is of the cross-current type, i.e. the two air streams pass through the heat exchanger at right angle relative one another.

According to FIG. 6 the heat exchanger is formed with a first group of channels or passageways 12 in which the main direction of stream of the air is horizontal as indicated by the arrows 14. These channels are defined by parallel walls 16 which are made of material impermeable to air or vapour such as plastic material or metal, e.g. aluminium or copper which in themselves are highly heat-conductive. These walls are kept spaced from one another by means of transversally extending wall portions 18 of the same or similar material which in the figures are diagrammatically indicated as plane strips rigidly secured to the walls 16, but which may be formed e.g. by a corrugated or folded intermediate layer with the corrugations or folds extending horizontally.

Another group 20 of channels or passageways have an extension in vertical direction and are defined by a coating or a layer 22 of a material having wetting i.e. water absorbing or distributing properties. The layer of flossed or velourized plastic material may be used also. In this case also, the channels or passageways are indicated digrammatically as rectangularly shaped. The wettable layers 22 bear against the walls 16 or interconnecting transverse walls 24 of suitably the same material as said transversal walls 18. The direction of the air streaming through the second group of channels is vertically downwards as indicated by arrows 26.

As already mentioned, the structure shown in FIG. 6 of the heat exchanger 10 is represented diagrammatically only. It is essential that the two groups of channels are separated from one another by partition walls 16 which only permit exchange by heat conduction between the two groups of channels. In addition, spacers of connecting transverse walls should be so formed or shaped that as much heat transfer as possible takes place between the two air streams. The channels or passageways between the partition walls 16 may be continuous along the whole extension of the walls.

In the embodiment according to FIG. 1, atmospheric air is taken in by means of a fan 28 and divided into a stream 30 of air to be conditioned which passes horizontally through the group of channels 12 in the heat exchanger 10. A branch stream or auxiliary stream of air moves vertically according to line 32 in downward direction through the second group of channels 20 of the heat exchanger. This group of walls 22 is wetted at the same time by water being supplied from above as is indicated by a sprayer means 34. The channels 12 are closed at the upper and lower horizontal faces of the heat exchanger, the channels 20 being closed at the two vertical lateral faces of the heat exchanger. The supply of water is limited so that the layers 22 are maintained wetted, but not more. Some circulation of water may be allowed, however e.g. by the sprayer means 34 moving over the upper front face of the exchanger and thereby intermittently and instantaneously supplying an excess of water which thus is collected down below the heat exchanger to be recirculated to the sprayer means 34 in a manner known per se. By causing air and water to pass through the channel system 20 in the same direction, the air assists in rapidly removing the excess of water supplied to the layers 22.

Figure 7:
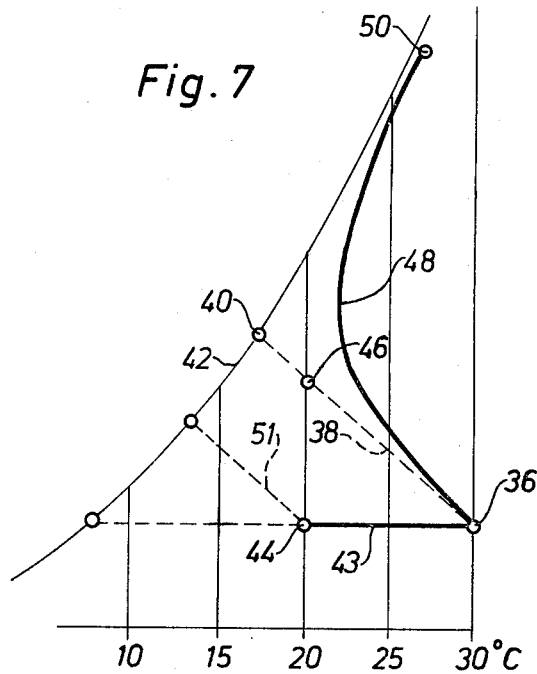
FIGS. 7 and 8 are two psychometric graphs corresponding to the embodiments shown in FIGS. 1 and 2, respectively.

The ordinate in the psychometric graph shown in FIG. 7 represents the absolute water vapour content of the air and the abscissa thereof the temperature of the air. The curve 42 represents the state of moisture-saturated air, the so-called saturation curve. The state of the atmospheric air is assumed to correspond to point 36 with a temperature of 30° C. The relative moisture content of the air is assumed to be low such as 30%. In the channels 20 the auxiliary air by evaporation of water from the wetted layers 22 is subjected to a change of state according to line 38 which means that it becomes more moistened under simultaneous increase of its enthalpy to point 50 which is located nearer the curve 42 for saturated air. In this way the walls 22 are cooled and cool in turn the stream of air to be conditioned passing through the channels 12 with unchanged absolute moisture content, i.e. along line 43. The air to be conditioned is assumed in the graph to be cooled to a temperature of 20° C corresponding to point 44. This represents the state of the stream of air to be conditioned when it is utilized for its intended purpose, e.g. for cooling of spaces. The auxiliary air stream is consumed after the heat exchange and is allowed to escape into the surrounding atmosphere. The quantity of auxiliary air need in this arrangement amount to a minor portion only of the air to be conditioned. In the embodiment in consideration said quantity has been assumed to be 30 percent of the quantity of air to be conditioned. The conventional method of cooling air by evaporation of water is to allow the air to be conditioned to pass through a nozzle chamber or a wet insert body, the air to be conditioned then having its temperature lowered by evaporation while its moisture content is increased. The change of state resulting therefrom follows the line 38 (a so-called temperature$_{wet}$-line) and the uttermost limit for the cooling which can be brought about in this manner is represented by point 40 on the saturation curve. In practice, it is impossible to reach the point 40 which corresponds to an efficiency of 100 percent. The point 46 at 20° has been indicated in FIG. 7 as representing a practically achievable result.

When comparing the state of air cooled by conventional evaporative cooling (point 46) with air cooled by indirect evaporative cooling (point 44) according to the method illustrated in FIGS. 1 and 7, one will observe that the indirectly cooled air has a considerably lower moisture content at the same temperature, which feature is of very high importance in the continued utilization of the air.

Thus, by the present invention a considerable lowering of temperature has been brought about in the stream of conditioned air, amounting in the described example to 10° C. At point 44, the conditioned air may still have a relatively low moisture content such as 45 percent An additional lowering of the temperature of the air can thus be obtained according to line 51, if the air subsequently is brought to pass through a moistener of known kind.

Figure 2:
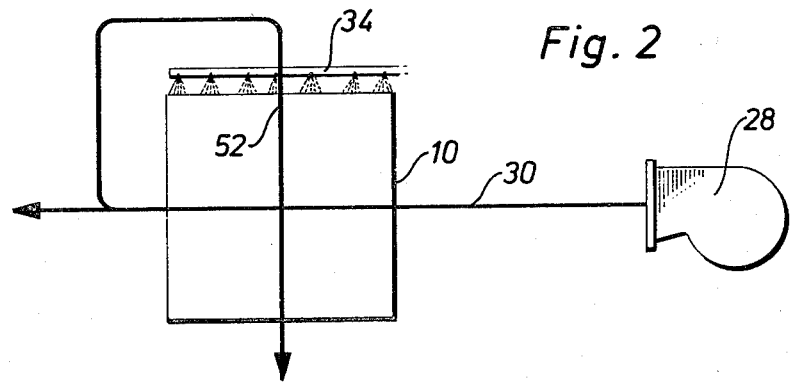
Figure 8:
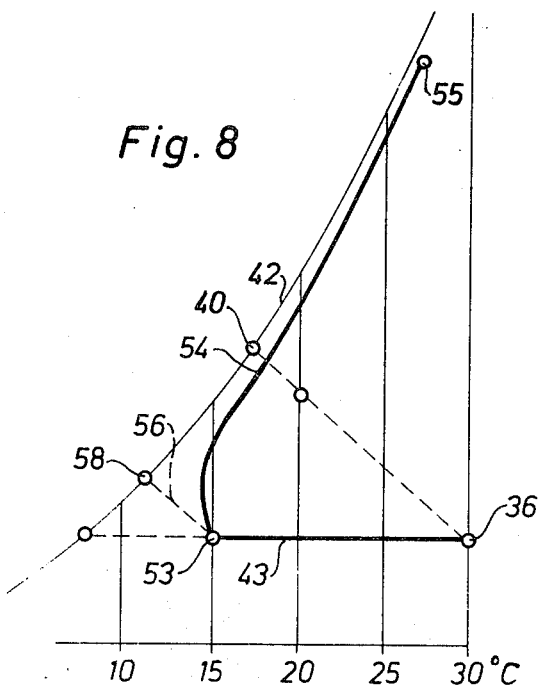

The embodiment according to FIG. 2 with associated psychometric graph represented in FIG. 8 differs from the preceding one by the whole stream 30 of outer or atmospheric air taken in by the fan 28 is caused initially to pass through the channel system 12 of the heat exchanger 10. Downstreams of the heat exchanger, an additional air stream 52 is taken out which stream flows downwards in the channel system 20 while being in contact with the wetted or moist layers 22. This results in that the air to be conditioned will be cooled to a lower value than according to FIG. 1, since the intake temperature of the auxiliary air stream and, beyond all, its so-called wet temperature is lower than in FIG. 7. In the embodiment in consideration, it has been assumed that cooling takes place to point 53 on line 43 which point corresponds to 15° C. The change of the state of the auxiliary air stream follows line 54 from point 53 up to the point 55 located highest in the graph. Thereafter the auxiliary air stream returns to the outer atmosphere.

In this embodiment, the auxiliary air stream thus is caused to cool itself also besides the air to be conditioned. For this reason normally a greater auxiliary air stream is required than in the embodiment described earlier. In the embodiment now in consideration it has been assumed that the ratio between the quantities of auxiliary air and air to be conditioned is 1:2. In return one has obtained a greatly increased cooling effect. One has even arrived at a lower temperature of the conditioned air than is theoretically possible to reach with conventional evaporative cooling (point 40).

By moistening, if desired, the conditioned air in an conventional moistening device the final state of said air will be located somewhere on line 56 which terminates on the saturation curve in point 58, i.e. at a temperature down towards 12° C.

Figure 3:
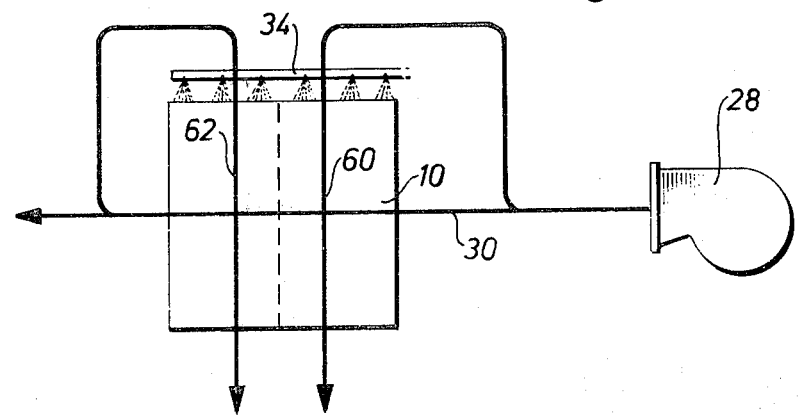

According to FIG. 3, the auxiliary air stream has been divided up into two branch streams, viz. a first part stream 60 which is taken from the entering air stream 30 upstreams of the heat exchanger, which involves that this branch stream has not been subjected to any cooling treatment in the heat exchanger and thus corresponds to the air stream 32 in FIG. 1. The other branch stream 62 is branched off downwards of the cooled stream 30 of the air to be conditioned, i.e. after that it has been passed through the heat exchanger 10. The stream of air to be conditioned exchanges heat initially with the branch stream 60 and subsequently with the branch stream 62. Thus the two branch streams pass each through its portion of the channel system 20 which as a whole is wetted by means of the water spraying means 34. This embodiment can give the same final state as according to FIG. 8 with a minor quantity of auxiliary air circulating through the channel system 12.

In the embodiment shown in FIG. 4, there is provided in parallel with and, if desired, combined with, a heat exchanger 10 an auxiliary heat exchanger 64 which is of the same principal structure as the heat exchanger 10 but which has for its purpose only to generate the stream of auxiliary air destined for the heat exchanger 10. Through a fan 66 the stream 68 for auxiliary air is introduced into, and passes horizontally through, the channel system 12 of the auxiliary exchanger 64, downstreams of said auxiliary air stream a minor branch stream 70 being taken out to pass vertically through the channel system 20 of the heat exchanger and to be wetted by means of water supplied by a sprayer means 72 in the same manner as described above. The remaining auxiliary air stream 74 that has been cooled individually, passes over to the heat exchanger 10 and cools the stream 30 of air to be conditioned in a similar manner as described in connection with FIG. 8.

The temperature of the stream of auxiliary air can be lowered after the cooling thereof if air is employed which has a lower moisture content than that of the outer air, i.e. air that has been dehumified. Such air may consist of air coming from the cooled spaces in such a case where the moisture contact of the space air has been lowered by means of an air conditioning aggregate. One can also dehumify the outer air prior to its introduction into the exchanger. Such a system is indicated in FIG. 4, where the stream 68 of auxiliary air is caused initially to pass through a generative moisture exchanger 76 of known kind, the rotor of which is regenerated by means of an air stream 78 which is generated by a fan 80 and heated to regenerating temperature by means of a heater system 82.

By generating the stream of auxiliary air in a heat exchanger separated from the main heat exchanger the fan system for the stream of auxiliary air need only be dimensioned to overcome the relatively low resistance which is created by the heat exchangers and connecting ducts. Contrary thereto the fan 28 of the stream generating the stream 30 of air to be conditioned must often operate with a many times higher pressure to overcome the resistance in the tubular ducts which connect the heat exchanger with the various spaces as well as the pressure drops in filters, heaters and coolers and means for blowing-in the air. Thus, a substantial saving in fan effect is gained by this embodiment. Furthermore, the auxiliary air system can be shut off totally during periods where cooling of the air in the spaces or rooms is not desired, thereby additionally reducing the fan work. This shutting off operation can be made without disturbing the conditions of flow in the circuit of air to be conditioned. In addition thereto, greater flexibility is obtained in the mode of mounting the exchanger as well as in the dimensioning thereof. One may thus, as is indicated in FIG. 4, have a greater flow passage depth in the additional air exchanger than in the main exchanger 10, by which arrangement it becomes possible to cool the stream of additional air to a still lower temperature. This lower temperature in turn results in that the air to be conditioned can be given required cooling with a lower through-flow passage depth which feature is to advantage for reducing the required performance of the fan 28 for the air to be conditioned.

A stream 74 of auxiliary air generated according to the embodiment of FIG. 4 can also be used in other manner than in the exchanger 10. Thus, the stream 74 of auxiliary air may be caused to pass through a cooling tower and there to cool water to a lower temperature than is possible by means of non-treated outer air. The cooled water can be utilized in turn to cool the air 30 to be conditioned in a conventional cooling system.

The embodiment illustrated in FIG. 5 differs from the preceding ones of both air streams passing their associated channel systems in counter-current or mainly counter-current. The embodiment shown in FIGS. 5 and 5A resembles that of FIG. 2 in so far as both the air to be conditioned and the auxiliary air are cooled together in the dry part of the exchanger. The non-treated air stream is introduced in the same manner as before, e.g. from the surrounding atmosphere and distributed thereafter from the duct 30 over the channel system 12 via an intake 84 located in the upper part of one of the vertical lateral surfaces of the heat exchanger 10. From this intake, channels 12 extend initially horizontally inwards and subsequently vertically downwards within the heat exchanger so that the stream 86 of cooled conditioned air is discharged at the bottom side of the exchanger whereas the auxiliary air stream 88 directly enters the adjacent channel system 20 within which auxiliary air stream flows in counter-current to the air in the channel system 12 during the main part of its passage through the exchanger. In FIG. 5 there is shown below the exchanger 10 a collecting trough 90 for circulating excess water from the spraying device 34 which water from the trough is pumped through a duct 92 back to the spraying device.

The use of counter-current results in a maximum utilization of the available cooling potential in the applied air streams while maintaining low pressure drops.

The embodiment illustrated in FIGS. 5 and 5A is operated with counter-current over the main part of the flow depth and gradual transition to cross-current in that part of the exchanger where the air stream 30 enters the exchanger. It is of great importance for the final result that counter-current is used in that part of the process where one normally has the smallest driving forces for the temperature exchange, i.e. in the coldest part of the exchanger, and therefor operation with counter-current in exactly this part of the exchanger results in the highest possible cooling effect.

From the view point of space requirement the described embodiment operating with counter-current has obvious advantages due to the fact that the auxiliary air stream after having been cooled directly enters the wet part of the exchanger. No additional connection ducts are required from the dry side to the wet side.

Of essential importance for the function of the described apparatus is the manner of arranging and maintaining the evaporation from the wet surfaces. Suppose, for instance that the moisture were evaporated into the auxiliary air stream by spraying fine drops of water into the auxiliary air stream. The cooling would then take place from the surfaces of the water drops and would be transmitted into the air and from the air to the partition wall and therefrom into the air to be conditioned. However, according to the invention it is essential that the evaporation mainly takes place directly from the partition wall between the auxiliary air and the air to be conditioned in order to attain the highest possible efficiency. Furthermore, it is of vital importance according to the invention that the average water-flow which is used for keeping the evaporative surfaces wetted be minimal. A large water flow would equalize the temperature gradients which develop in the exchanger, and thereby considerably reduce the cooling effect.

According to the invention, a substantially static liquid layer or film is maintained by reason of the fact that the partition walls between the air streams on the wet side are provided with a bibulous or or absorbing layer whereby the interaction between the flowing media takes place without any appreciable equalization of the temperature gradients along the path of the flowing water with consequent reduction in thermal capacity. The absorbing layers thus eliminate the requirement of large and continuously flowing quantities of water over each individual portion of the wet surfaces. The evaporative surfaces can be rewetted intermittently and maintained wet over a time interval which can be extended over many minutes before subsequent rewetting becomes necessary. It is advantageous during a short period of rewetting to arrange for an intensive rinsing action so that dust particles and mineral deposits emanating from the water are flushed off. Such supplying with water can be effected over the entire area to be watered or a great portion thereof by showering the surfaces briefly, but intensively. One can also employ a spreading or spraying device which with a continuous water flow slowly moves over the area to be watered and feds a strong stream of water to one channel or some few channels or interspaces only at a time. In the other channels a stream of auxiliary air advances undisturbed under the same time. The excess of water which is supplied in this way, is collected in a trough below the exchanger and is recirculated to the spreading or spraying device. So much water is supplied to the system as is required for replacing the evaporated water together with a further quantity to keep the mineral content of the circulating water at a low value. By supplying water in the manner described above, the length of the watering period is made substantially shorter than that of the intermediate period of evaporation.

In the embodiments shown by way of example in the drawing figures the fans are placed ahead of the exchangers. This is of importance for obtaining a maximum cooling effect. During its passage through the fans the air is heated to some extent. By effecting cooling in the exchanger of the air after this heating this quantity of heat is removed with the auxiliary air instead of becoming introduced into the cooled space.

From the watering devices shown in the figures it is easily understood that the film of water is maintained by supplying water with a direction of flow which coincides with, or is in opposite direction to, the direction of flow of the auxiliary air. However, it is possible to arrange the supply of water so that the flow of water has vertical direction whereas the stream of auxiliary air has horizontal direction.

We claim:
1. In a method of conditioning a first air stream by cooling by means of a second auxiliary air stream in a heat exchanger having two groups of channels separated from each other by walls through which heat exchange between the air streams occurs and having wettable material lining the channels through which the auxiliary air stream flows maintained wet by means of water which is caused to evaporate by the auxiliary air stream passing thereover to obtain cooling of the first stream with substantially unchanged moisture content thereof, the improvement providing increased conditioning efficiency comprising the step of applying water to the wettable material intermittently only for a period of time shorter than the period of time in which the evaporation takes place and in an amount in excess of that amount required for replacing the amount evaporated.

2. An improved method according to claim 1 wherein the auxiliary air stream first passes through a heat exchanging means distinct from the regenerative heat exchanger conditioning the first stream.

3. An improved method according to claim 1 in which both the air stream to be conditioned and the auxiliary air stream comprise ambient atmospheric air.

4. An improved method as claimed in claim 1 wherein at least one of the air streams comprises air which has been previously dried.

5. An improved method as claimed in claim 1 wherein at least a portion of the auxiliary air stream comprises a portion of the conditioned air stream which has been cooled in the regenerative heat exchanger.

6. An improved method as claimed in claim 5 in which the auxiliary air stream flows through the wetted channels in two distinct streams, one of which comprises air split off from the conditioned air stream after it has been cooled within the regenerative heat exchanger.

7. The improved method as claimed in claim 6 wherein the heat exchanger includes two zones through which the air to be conditioned passes, in the first zone of which the auxiliary air stream flowing in the wetted channels consists of unconditioned air while in the second zone the auxiliary air stream comprises air which has been split off from the conditioned air stream after it has been cooled by passage through the entire two zones of the regenerative heat exchanger.

8. In a heat exchanger apparatus for conditioning a first stream of air by cooling by a second auxiliary air stream having two groups of channels separated from one another, the walls of which provide heat exchange surfaces for exchanging heat between the two air streams, the channel walls of the auxiliary air stream channels including wettable material maintained wet to permit evaporation by the auxiliary air stream to provide cooling of the wall surface and thus cooling of the air stream to be conditioned with substantially unchanged moisture content, the improvement providing increased heat exchange efficiency comprising means applying water to the wettable material intermittently for a period of time shorter than the period of time in which the evaporation takes place in an amount in excess of that amount required for replacing the amount evaporated.

* * * * *